United States Patent [19]
Willinger

[11] 3,747,250
[45] July 24, 1973

[54] FISH NET
[75] Inventor: Allan H. Willinger, New Rochelle, N.Y.
[73] Assignee: Metaframe Corporation, Maywood, N.J.
[22] Filed: Mar. 19, 1971
[21] Appl. No.: 126,237

[52] U.S. Cl. .................................................. 43/11
[51] Int. Cl. ............................................ A01k 77/00
[58] Field of Search ....................... 43/11, 12, 4, 55, 43/56

[56] References Cited
UNITED STATES PATENTS
| | | | |
|---|---|---|---|
| 2,847,790 | 8/1958 | Tjernagel | 43/11 |
| 3,025,629 | 3/1962 | Sears | 43/55 |
| 3,394,483 | 7/1968 | Taglioli | 43/11 |
| 2,670,557 | 3/1954 | Pachner | 43/4 |
| 2,722,770 | 11/1955 | Giordano | 43/55 |

Primary Examiner—Warner H. Camp
Attorney—Friedman & Goodman

[57] ABSTRACT

A fish net comprising a handle and a net connected to the handle. The net includes a transparent water-impervious portion which is readily deformable from that of a water-free configuration to that of a water-carrying configuration. The net furthermore includes a water-pervious portion which is connected to the water-impervious portion and constitutes together with the latter an open pocket. The periphery of the open pocket, or mouth thereof, is connected to an enlarged opening provided at one end of the handle.

8 Claims, 3 Drawing Figures

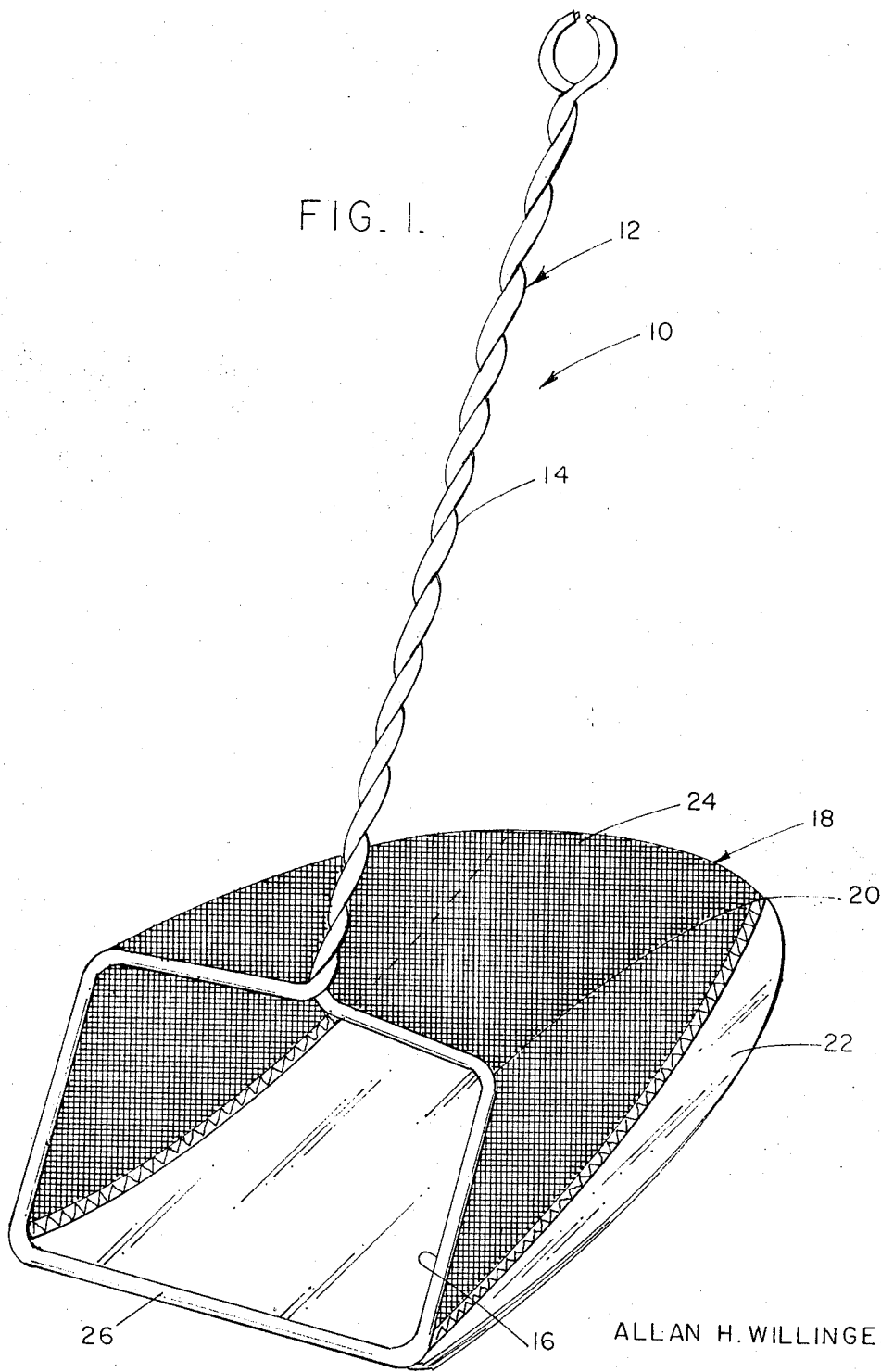

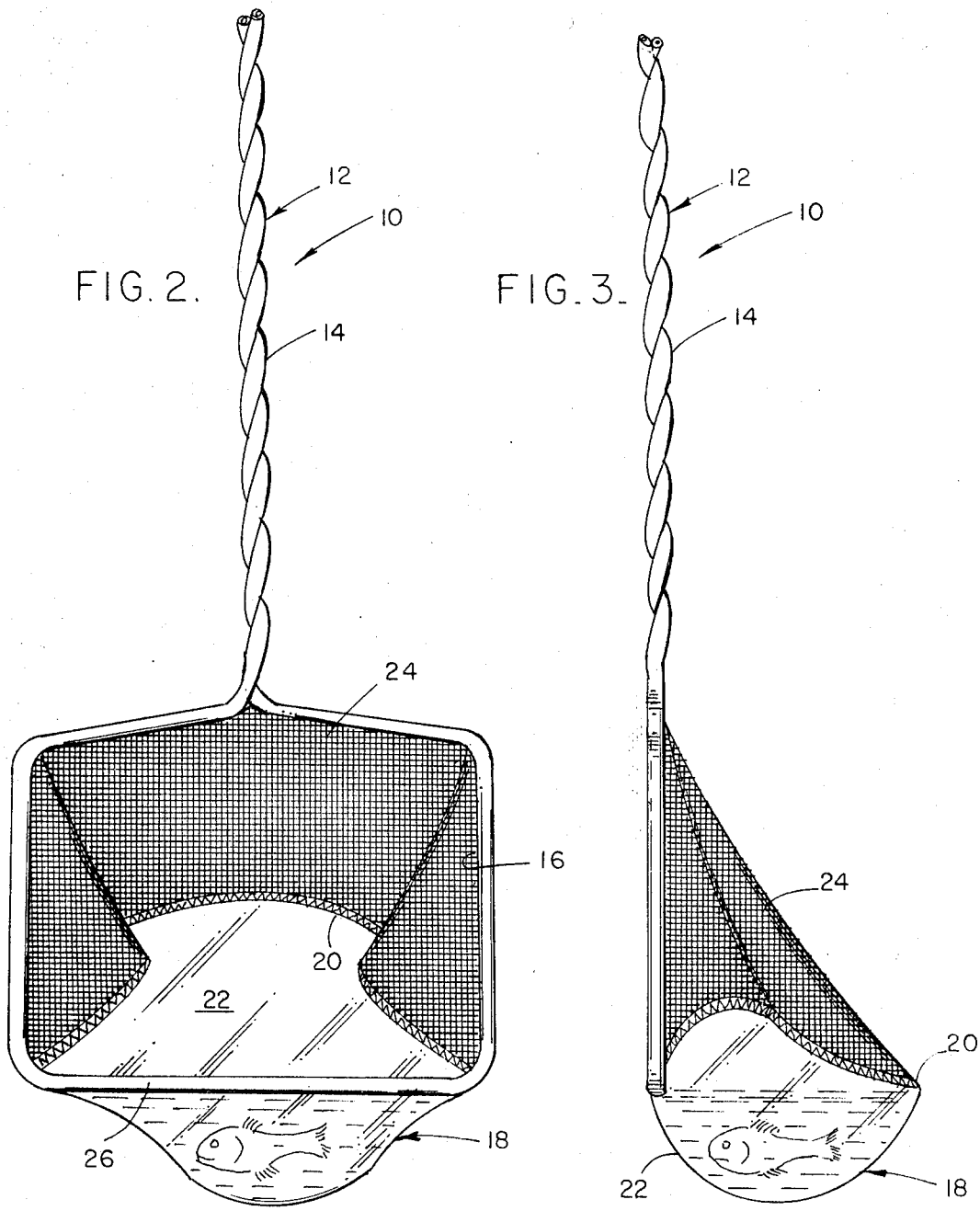
ALLAN H. WILLINGER
INVENTOR
BY Friedman and Goodman
ATTORNEYS

FISH NET

BACKGROUND OF THE INVENTION

The present invention relates generally to a fish net for withdrawing a fish or the like from the confines of a fish tank or aquarium, and more particularly to a fish net having a transparent water-impervious portion for carrying water together with a fish to permit observation of the latter without injury thereto.

Generally, when an aquarium hobbyist wishes to withdraw a fish or the like from the confines of a fish tank or aquarium, the hobbyist generally inserts a fish net of conventional variety, i.e., a net constituted of a synthetic material having a network of openings of mesh extent, into the fish tank and proceeds to surround the fish with the fish net and gently lift the fish from the aquarium in a manner as is common practice.

As the hobbyist lifts the fish net from the confines of the aquarium, all of the water passes through the net thus exposing the fish directly to the air and thus possible injury. In this respect, since no water remains in the net, the fish which has the tendency, as those skilled in the art readily appreciate, to persistently attempt escape and usually entangles itself within the readily deformable net thus causing possible injury to its scales and fins due to the ensuing difficulty that the hobbyists has when attempting to free the fish from entanglement in the net. Furthermore, the fish which is directly exposed to the air because of the absence of water in the net may be exposed to a temporary shock as a result of both temperature variation and sudden difference in environment.

Of course, if the fish is directly and immediately positioned into another fish tank or aquarium adjacent to the one from which the fish is initially removed or withdrawn, there is obviously a reduction in the extent of potential injury that the fish may be subjected to. However, as is often the case, a fish is withdrawn from the confines of the aquarium for purposes of inspection and observation. Observation is often necessary for purposes of determining the specific nature of the sex of the fish and for a myriad of other reasons as those skilled in the art well understand. The period of observation may sometimes be excessive in that the fish does not remain in water and, thus, since the fish is in direct contact with the net, as discussed above, the fish may be subjected to possible injury whether the injury be related to scale or fin damage or in fact shock. It is clear, therefore, that the conventional fish net which is utilized or employed by the hobbyist has numerous disadvantages with regard thereto and is thus less than satisfactory.

SUMMARY OF THE INVENTION

Accordingly, it is an object of the present invention to provide a fish net which permits the withdrawal of a fish from the confines of a fish tank or aquarium.

It is another object of the present invention to provide a fish net which permits lengthly observation of a fish at close quarters after removal of the latter from its aquarium.

It is still another object of the present invention to provide a fish net which obviates potential injury to a fish that is withdrawn thereby from a fish tank.

It is still a further object of the present invention to provide a fish net that obviates potential entanglement of a fish therein after removal of the fish from an aquarium.

It is another object of the present invention to provide a fish net that has a transparent water-impervious portion for carrying a fish in a constant water environment.

It is still a further object of the present invention to provide a fish net that although withdraws a fish in a constant water environment also permits excess water to drain therefrom beyond that amount which is necessary for containing a fish properly in water of specific quantity.

To this end, the present invention relates to a fish net comprising a handle and a net connected to the handle. The net includes a transparent water-impervious portion which is readily deformable from that of a water-free configuration to that of a water-carrying configuration. The net furthermore includes a water-pervious portion which is connected to the water-impervious portion and constitutes together with the latter an open pocket. The periphery of the open pocket, or mouth thereof, is connected to an enlarged opening provided at one end of the handle.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which:

FIG. 1 illustrates a perspective view of the fish net according to the present invention;

FIG. 2 illustrates a front elevational view, partly perspective, of the fish net of the present invention in an upright position wherein there is contained a fish and water for surrounding the fish; and FIG. 3 illustrates a side elevational view of the fish net of the present invention in an upright position containing both water and a fish in the water.

DETAILED DESCRIPTION OF THE INVENTION

Referring now to the drawings, and more particularly to FIG. 1, the present invention comprises a fish net generally denoted by the reference character 10. The fish net 10 includes a handle 12 having a manipulating portion 14. At the opposite end of the manipulating portion 14 is provided an end portion having an enlarged opening 16 as illustrated in FIGS. 1 and 2. Connected to the periphery of the enlarged opening 16 of the handle 12 is a net or pocket 18 having a closed end portion 20. The pocket 18 includes a water-impervious portion 22 and a water-pervious portion 24 connected to one another as illustrated.

Referring now to FIGS. 2 and 3 of the drawings, as those skilled in the art readily understand, the fish net 10 according to the present invention may be inserted into the confines of a fish tank and removed therefrom in a generally vertical position to withdraw both a fish and a specific quantity of water for containing the fish. Upon withdrawing the fish net 10 from the confines of the aquarium, the pocket 18 assumes a configuration as illustrated most clearly in FIGS. 2 and 3 such that a specific quantity of water remains within the confines of the water-impervious portion 22 and all excess water is lost from the pocket 18 as the water-pervious portion 24 permits the passage or drainage of excess water therethrough.

The water-impervious portion 22 is generally constituted of a thin gauge of transparent film, of plastic derivation such as Mylar, or the like, and thus will deform readily for retaining both water and a fish. Because of the transparent nature of the water-impervious portion 22, as is clearly illustrated in FIGS. 2 and 3, the fish may be observed readily and for a rather lengthy period of time because of the maintenance of water. The water-pervious portion 24 is generally constituted of a natural or synthetic material having a network or openings of mesh extent and is readily deformable cooperatively with the water-impervious portion 22. Thus, the net or pocket 18 which is illustrated in FIG. 1 as having a generally water-free configuration may be deformed readily so as to assume a water-carrying configuration as illustrated both in FIGS. 2 and 3.

The enlarged opening 16 of the handle 12 is generally rectangular in the preferred embodiment, although the latter configuration need not necessarily be the case, and terminates in an end-most peripheral portion 26 as illustrated in FIG. 2. The latter is of generally straight extent and most remote from and transversely of the manipulating portion 14 of the handle 12. The significance of the srtaight extent of the end-most peripheral portion 26 of the enlarged opening 16 is noteworthy in function since in fact when the water-impervious portion 22 is in its water-carrying configuration as illustrated both in FIGS. 2 and 3, the latter assumes a distended position below the end-most peripheral portion 26 so that the fish may be readily observable with minimal interference.

In this respect, since the water-impervious portion 22, in the preferred embodiment, is connected directly to the end-most peripheral portion 26 and the water-pervious portion 24 is connected to the remaining peripheral portions of the enlarged opening 16 upon withdrawing a fish with the fish net 10, the water-impervious portion 22 displaces to a position most remote from the manipulating portion 14 beyond or below the end-most peripheral portion 26 so that the fish contained therein may be readily observed. If the periphery of the enlarged opening 16 were circular or if the end-most peripheral portion 26 of the enlarged opening 16 were arcuate, the latter would interfere substantially with the observation of the withdrawn fish from vantage points corresponding to the visibility of the withdrawn fish as illustrated in FIG. 2. Thus, the straight extent of the end-most peripheral portion 26 does serve an important function in that the exposed area of the enlarged opening 16 is large enough for permitting the hobbyist to capture a fish and withdraw the latter selectively and yet does not at all interfere substantially with the visibility of the withdrawn fish from most vantage points.

It is clear therefore, that the fish net pursuant to the present invention may be easily employed for withdrawing a fish from the confines of a fish tank or aquarium and permits ready observation of the fish because of the transparent nature of the water-impervious portion 22. Furthermore, because of the water-impervious nature of the portion 22, the latter deforms readily from that configuration which is free of water to that configuration for carrying water. Thus, the withdrawn fish remains in a water environment even after being withdrawn from the aquarium and there is little possibility for the fish to entangle itself in the net or pocket 18 or be exposed to shock due to temperature and atmospheric changes. Furthermore, the water-pervious portion 24 acts to release all excess water beyond that which is necessary for properly confining the fish and thus the weight of the fish net 10, together with the withdrawn fish and withdrawn water, is not excessive and will not distort or cause distortion of the handle 12. The handle 12 may thus be constituted of metallic material, encapsulated in a plastic or rubberized sleeve for protective purposes, and need not be excessively rigid beyond that which is conventionally utilized for the conventional fish net.

Numerous alterations of the structure herein disclosed will suggest themselves to those skilled in the art. However, it is to be understood that the present invention which is for purposes of illustration only and not to be construed as a limitation of the invention.

What is claimed is:

1. A fish net comprising a handle member and a net member, said handle member including a manipulating portion and an end portion defining an enlarged opening, said end portion including first and second elements disposed on opposite sides of said enlarged opening, said manipulating portion being connected to said first end portion element, said second end portion element being generally straight and extending transversely of said manipulating portion with said second end portion element being spaced from said manipulating portion by said enlarged opening, said net member including a water-impervious portion connected to a water-pervious portion to define a pocket, said pocket including a closed end portion and an open mouth portion spaced opposite said closed end portion, said open mouth portion of said pocket being connected to said end portion of said handle member with said water-impervious portion being secured to said straight second end portion element and said water-pervious portion being secured to said first end portion element, said water-impervious portion being readily deformable from a water-free configuration to a water-carrying configuration for containing a fish in a water-environment after removal of the fish from an aquarium, and said water-impervious portion being transparent to permit observation of the fish contained by said water-carrying configuration.

2. A fish net as claimed in claim 1, wherein said transparent water-impervious portion is constituted of a thin film of plastic derivation.

3. A fish net as claimed in claim 1, wherein said water-pervious portion is constituted of synthetic material having a network of openings of mesh extent and is readily deformable cooperatively with said water-impervious portion.

4. A fish net as claimed in claim 1, wherein said closed end portion of said pocket is displaceable beyond said second end portion element and most remote from said manipulating portion when said water-impervious portion is in said water-carrying configuration.

5. A fish net as claimed in claim 1, wherein said water-impervious portion is connected to said end portion of said handle member solely along said straight second end portion element, said water-pervious portion being connected to the remaining peripheral extent of said end portion which includes said first end portion element.

6. A fish net as claimed in claim 1, wherein the peripheral extent of said end portion of said handle member including said first and second end portion elements defines a rectangular configuration.

7. A fish net as claimed in claim 1, wherein said water-impervious portion extends from said open mouth portion of said pocket to said closed end portion of said pocket.

8. A fish net as claimed in claim 1, wherein said handle member is constituted of a rigid material.

* * * * *